United States Patent [19]

Gearhart

[11] Patent Number: 4,856,975
[45] Date of Patent: Aug. 15, 1989

[54] COEXTRUSION BLOCK, ESPECIALLY FOR THE COEXTRUSION OF GENERALLY FLAT PVC ARTICLES, SUCH AS SIDING

[75] Inventor: Kenton Gearhart, Moundridge, Kans.
[73] Assignee: American Maplan Corporation, McPherson, Kans.
[21] Appl. No.: 237,211
[22] Filed: Aug. 26, 1988
[51] Int. Cl.[4] .............................................. B29C 47/04
[52] U.S. Cl. ............................. 425/131.1; 264/177.1; 425/133.1; 425/133.5; 425/462
[58] Field of Search .................. 425/130, 131.1, 133.1, 425/133.5, DIG. 243, 462; 264/177.1, 177.17

[56] References Cited

U.S. PATENT DOCUMENTS

| | | | |
|---|---|---|---|
| 4,386,891 | 6/1983 | Riefel et al. | 418/81 |
| 4,405,547 | 9/1983 | Koch et al. | 425/133.5 |
| 4,426,344 | 1/1984 | Dinter et al. | 425/133.5 |
| 4,548,569 | 10/1985 | Pitigliano et al. | 425/130 |
| 4,708,615 | 11/1987 | Bethea et al. | 425/131.1 |

FOREIGN PATENT DOCUMENTS 2425655  12/1975  Fed. Rep. of Germany ... 425/133.5

Primary Examiner—Jay H. Woo
Assistant Examiner—Timothy W. Heitbrink
Attorney, Agent, or Firm—Herbert Dubno

[57] ABSTRACT

A coextrusion block for siding communicates through respective separate circular inlets with two extruders at the inlet side of the coextrusion block while, at the outlet side, a curved kidney-shaped outlet is disposed about an inlet of acorn shape so that the outlets have boundaries lying along the common circle which corresponds to the circular inlet of the broad-mouth die.

10 Claims, 3 Drawing Sheets

COEXTRUSION BLOCK, ESPECIALLY FOR THE COEXTRUSION OF GENERALLY FLAT PVC ARTICLES, SUCH AS SIDING

FIELD OF THE INVENTION

My present invention relates to a coextrusion block for the coextrusion of thermoplastic articles and, more particularly, the coextrusion of flat articles such as siding.

BACKGROUND OF THE INVENTION

Coextrusion of PVC (polyvinyl chloride) allows various types of PVC to be used in different zones of a workpiece. For example, coextrusion has been used to bond a capstock material in a relatively thin exposed superficial layer, to a substrate material which can be a PVC foam.

In the past, for the coextrusion of generally flat workpieces, such as siding, it has been the practice to feed the two streams of PVC to the outlet of a coextrusion block in a pattern in which, over the length of the passages for the materials in the coextrusion block, the flows were generally of rectangular cross section.

When the two flows emerged at the circular outlet, the capstock material occupied a segment separated from the body of substrate material by a chord of the circular outlet.

Coextrusion of PVC for the production of siding in this fashion has been found to involve problems with respect to burn up. Heretofore, because of the way in which the two flows were generated in the extrusion block and met at the outlet, flow angles were considerable and back pressure at high output rates generated high temperatures resulting in damage to the PVC materials and the need to carefully control the compositions of such materials and counteract the tendency to burn up by adjustment of the composition. The need to carefully control the composition to prevent burn up, of course, greatly reduced the versatility of the apparatus.

OBJECTS OF THE INVENTION

It is the principal object of the present invention to provide an improved coextrusion assembly which eliminates the drawbacks enumerated above.

Another object of the invention is to provide an improved coextrusion block in which the spreading of the material into rectangular patterns in the die, especially broad flat patterns, starting from a circular die inlet, can be improved.

SUMMARY OF THE INVENTION

I have discovered that the disadvantages outlined above can be reduced or eliminated by providing a coextrusion block, especially for PVC and flat workpieces to be made by coextrusion therewith, in which the capstock material is caused to flow in a manner which enables the capstock material to straddle the flow of substrate material so that the outlet of the flow passage for the capstock material has an arcuate kidney shape while the material flanked thereby has an acorn-shaped flow cross section and outer margins of the outlets for the two materials lie along a common circle upon which the inlet of the die is centered and with which the die inlet registers.

More particularly, the apparatus of the invention can comprise:

a first extruder for supplying a synthetic resin capstock material;

a second extruder for supplying a synthetic resin substrate material;

a coextrusion block formed at one side with spaced-apart first and second circular inlets connected respectively to the first and second extruders for receiving the capstock material and the substrate material, respectively, the block being formed at an opposite side with a first outlet for the capstock material and a second outlet for the substrate material, the first outlet having generally an elongated arcuate kidney shape extending arcuately around and straddling the second outlet, the second outlet having a generally acorn-shaped outline, the first and second outlets having diametrically opposite margins lying along a common circle, the coextrusion block being further formed with respective passages smoothly connecting the first inlet with the first outlet and the second inlet with the second outlet; and a die having a circular inlet coaxial with the common circle and registering with both the outlets, a wide mouth from which a flat workpiece consisting of the materials in respective layers emerges, and a passage flaring from the circular inlet of the die to the mouth.

The invention, of course, also comprises the coextrusion block used in this assembly. While preferably the ends of the first coextrusion block outlet, i.e. the outlet for the capstock material, lie substantially at a plane through the center of the common circle and perpendicular to the symmetry plane, it is possible to terminate these ends short of this transverse plane or to extend the ends through and beyond this transverse plane.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
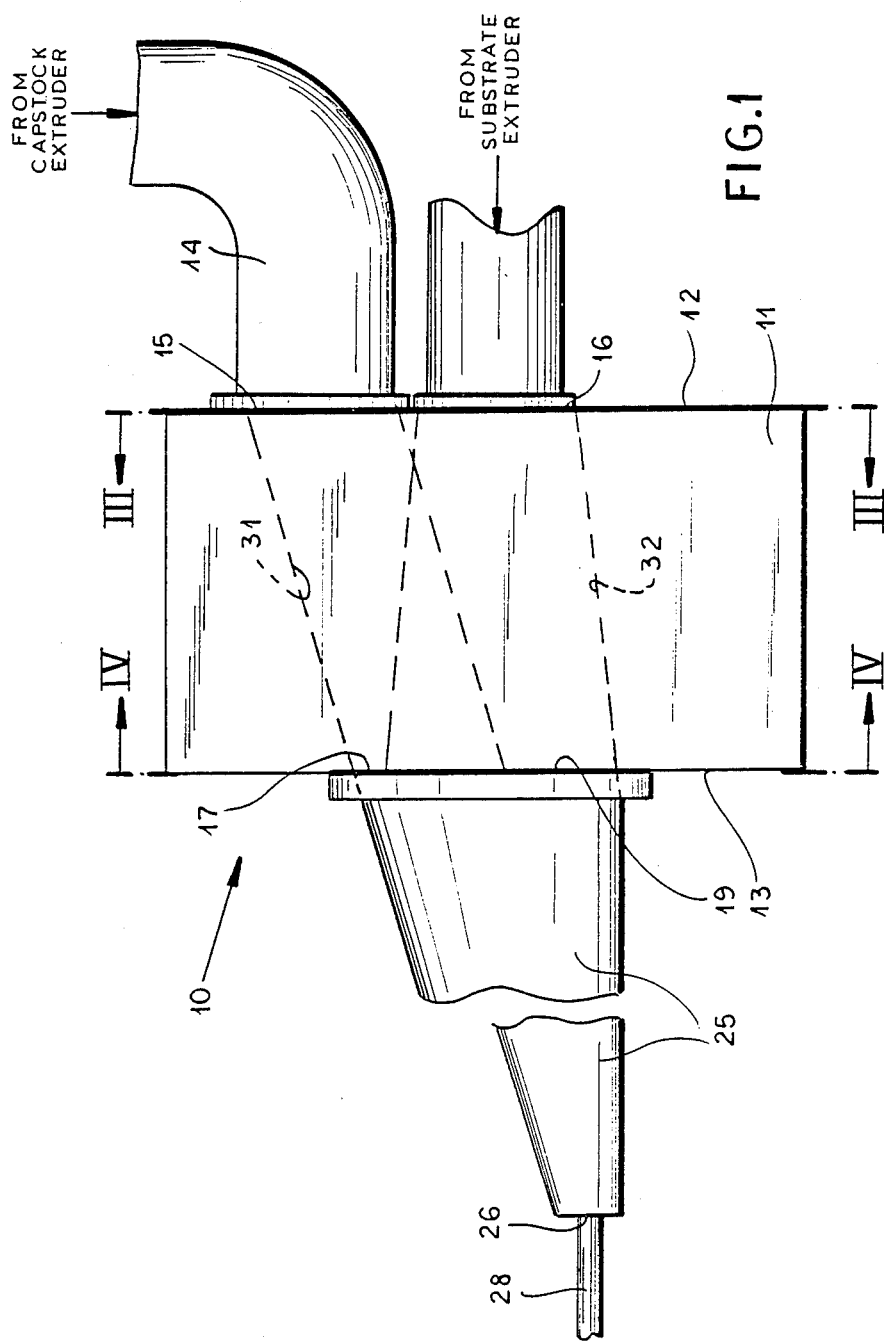
FIG. 1 is a side elevational view in highly diagrammatic form, illustrating the assembly of the present invention.
Figure 3:
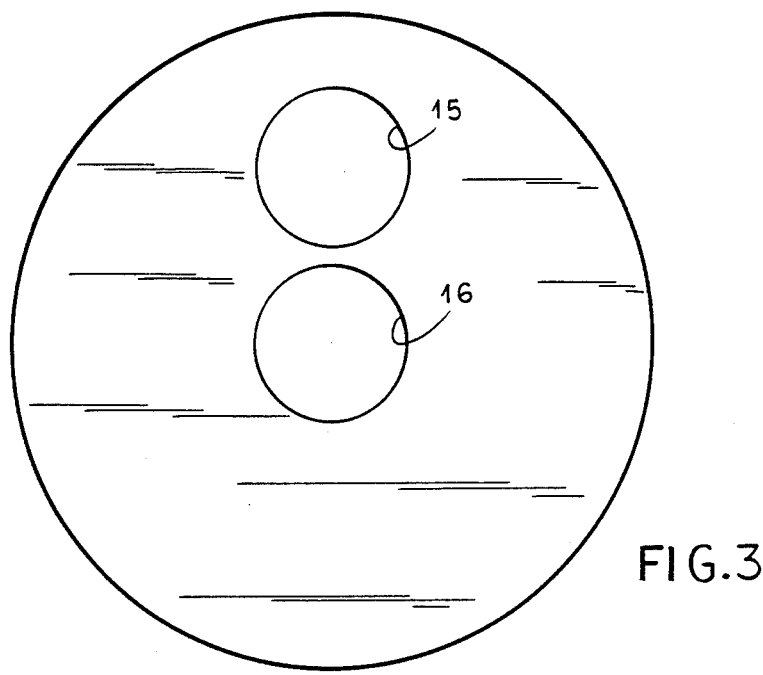
FIG. 3 is a view taken along the line III—III of FIG. 1.

The coextrusion assembly 10 shown in FIG. 1 comprises a coextrusion block 11 which is of rectangular parallelepipedal configuration with an inlet side 12 and an outlet side 13, parallel to one another. A first extruder delivering a capstock material is connected via its elbow 14 to a first inlet 15 for the capstock material as is best seen in FIGS. 1 and 3.

A second extruder delivering the substrate material, e.g. a foamable PVC, communicates with the circular second inlet 16 at the inlet side 12 of the coextrusion block.

At the outlet side of the coextrusion block, the capstock or first outlet 17 is formed with rounded ends 18 and has a curved kidney shape symmetrical about a symmetry plane $P_s$.

The second outlet 19 is generally the outline shape of an acorn with a large arcuate sector 20 opposite a short sector 21. The sector 21 conforms generally to the inner curvature of the first outlet 17.

The outer margins 22 of the first outlet 17 and 20 of the second outlet 19 lie along a common circle of radius R having a center $C_1$.

Figure 4:
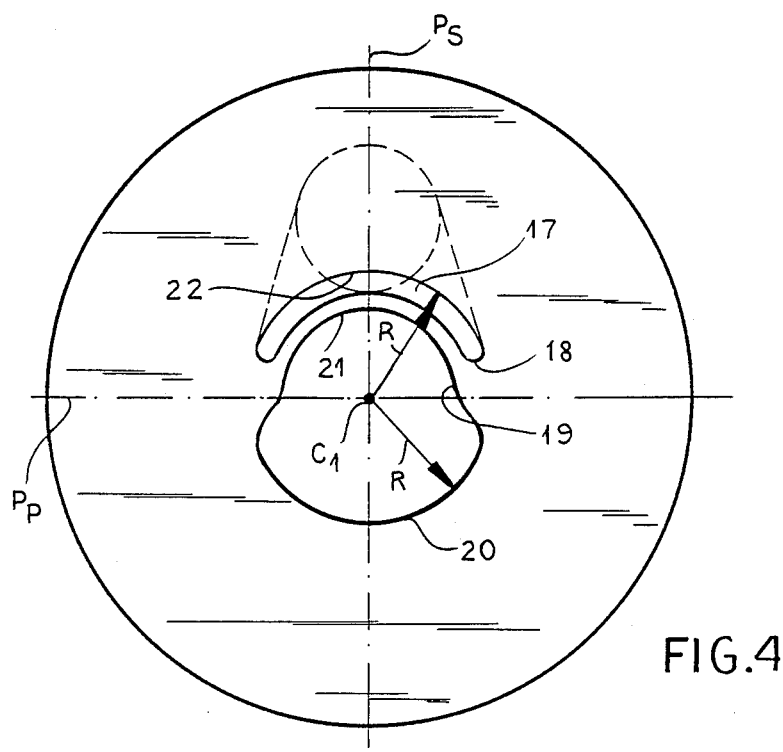
FIG. 4 is a view taken along the line IV—IV of FIG. 1.

In the embodiment shown in FIG. 4, the rounded ends 18 terminate short of a transverse plane $P_p$ through the center $C_1$ and perpendicular to the symmetry plane $P_s$. As can be seen from FIG. 4, moreover, the arcuate first outlet 17 in part straddles the flow through the outlet 19.

Figure 5:
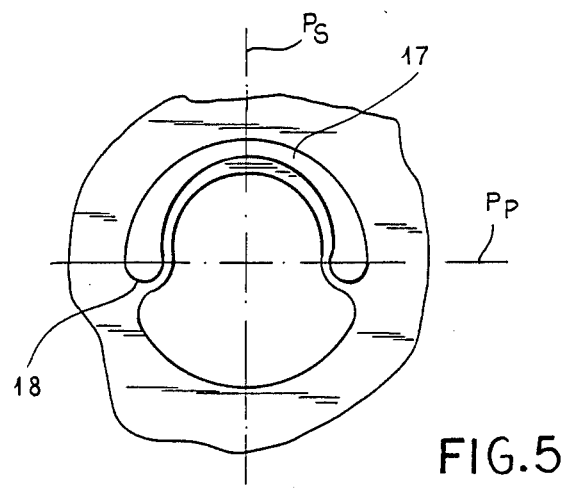
FIGS. 5 and 6 are fragmentary views showing the first and second outlets of the coextrusion block according to other embodiments of the invention.
Figure 6:
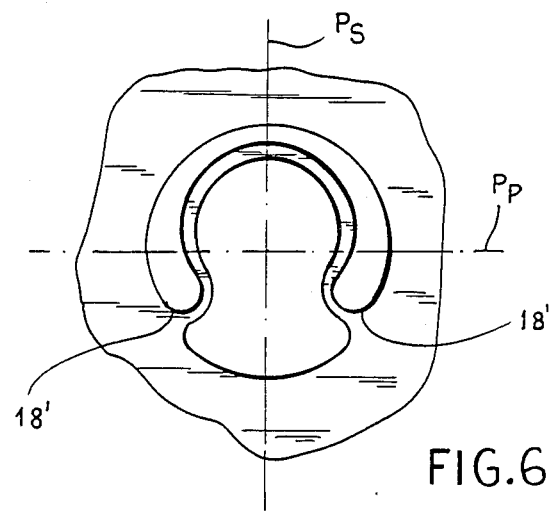

In the preferred embodiment illustrated in FIG. 5, the rounded ends 18 of the first outlet 17 for the capstock material lie substantially at the plane $P_p$. In the embodiment of FIG. 6, however, the rounded ends 18' project beyond the plane $P_p$.

I have found, quite surprisingly, that when the circular inlet of a siding die 25 is of radius R and registers with the two outlets 17 and 19, the two flows are so wrapped one around the other as to enable extrusion through a broad mouth 26 of the die in a two-layer extrusion 28 of siding without the drawbacks enumerated above.

Figure 2:
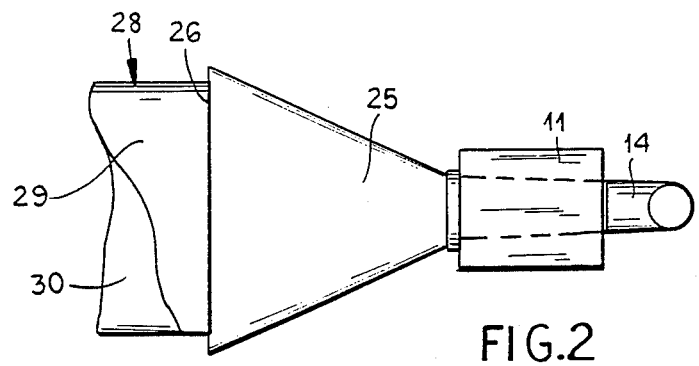
FIG. 2 is an elevational view of the assembly drawn to a larger scale.

Furthermore, the two layers are effectively bonded together and the capstock has been broken away at 29 from the substrate material at 30 in FIG. 2 only for purposes of illustration.

Burn up of PVC material is largely avoided even at high production rates.

In the drawing the passages 31 and 32, which connect the first inlet with the first outlet and the second inlet with the second outlet, have been illustrated only in dot-dash lines and can have any desired pattern, although generally they are developed with straight-line generatrices.

I claim:

1. A coextrusion assembly for the extrusion of wide generally flat workpieces in the form of extruded siding, said assembly comprising:
   a first extruder for supplying a synthetic resin capstock material;
   a second extruder for supplying a synthetic resin substrate material;
   a coextrusion block having an upstream side and a downstream side, said block being formed at said upstream side with spaced apart first and second circular inlets opening on a common face of said block and connected respectively to said first and second extruders for receiving said capstock material and said substrate material, respectively, said block being formed at said downstream side with a first outlet for said capstock material and a second outlet for said substrate material, said first outlet having generally an elongated arcuate kidney shape with terminal lobes connected by an arcuate region extending arcuately around and strangling said second outlet, said second outlet having a generally acorn-shaped outline with opposite rounded segments of different radii of curvature having S-shaped transitions between them, said first and second outlets having diametrically opposite margins lying along a common circle, said coextrusion block being further formed with respective passages smoothly connecting said first inlet with said first outlet and said second inlet with said second outlet whereby flow from said first outlet wraps around flow from said second outlet; and
   a die having a circular inlet coaxially with said common circle and registering with both sides outlets, a wide mouth from which a flat workpiece consisting of said materials in respective layers emerges, and a passage flaring from said circular inlet of the die to said mouth.

2. The coextrusion assembly defined in claim 1 wherein said outlets are symmetrical with respect to a plane of symmetry including centers of said first and second inlets and said common circle.

3. The coextrusion assembly defined in claim 2 wherein said first outlet has rounded ends terminating substantially at a plane through said center of said common circle and perpendicular to said plane of symmetry.

4. The coextrusion assembly defined in claim 2 wherein said first outlet has rounded ends terminating short of a plane through said center of said common circle and perpendicular to said plane of symmetry.

5. The coextrusion assembly defined in claim 2 wherein said first outlet has rounded ends passing through and terminating beyond a plane through said center of said common circle and perpendicular to said plane of symmetry.

6. A coextrusion block for use with two extruders and an extrusion die for producing generally flat workpieces in the form of extruded siding by the coextrusion of two polyvinylchloride materials, said coextrusion block comprising a body having an upstream side and a downstream side, said body being formed at said upstream side with spaced apart first and second circular inlets opening on a common face of said block and connected respectively to first and second ones of said extruders for receiving a capstock polyvinylchloride material and a substrate polyvinylchloride material, respectively, said block being formed at said downstream side with a first outlet for said capstock material and a second outlet for said substrate material, said first outlet having generally an elongated arcuate kidney shape with terminal lobes connected by an arcuate region extending arcuately around and straddling said second outlet, said second outlet having a generally acorn-shaped outline with opposite rounded segments of different radii of curvature having S-shaped transitions between them, said first and second outlets having diametrically opposite margins lying along a common circle so as to communicate with an inlet of said die registering with said common circle, said body being further formed with respective passages smoothly connecting said first inlet with said first outlet and smoothly connecting said second inlet with said second outlet whereby flow from said first outlet wraps around flow from said second outlet.

7. The coextrusion block defined in claim 6 wherein said outlets are symmetrical with respect to a plane of symmetry including centers of said first and second inlets and said common circle.

8. The coextrusion block defined in claim 7 wherein said first outlet has rounded ends terminating substantially at a plane through said center of said common circle and perpendicular to said plane of symmetry.

9. The coextrusion block defined in claim 7 wherein said first outlet has rounded ends terminating short of a plane through said center of said common circle and perpendicular to said plane of symmetry.

10. The coextrusion block defined in claim 7 wherein said first outlet has rounded ends passing through and terminating beyond a plane through said center of said common circle and perpendicular to said plane of symmetry.

* * * * *